(12) United States Patent
Varadarajan et al.

(10) Patent No.: US 8,768,784 B1
(45) Date of Patent: Jul. 1, 2014

(54) EXPEDITED SELLER REGISTRATION

(75) Inventors: Anand Varadarajan, Bellevue, WA (US); Seema P. Degwekar, Seattle, WA (US); Kimberly E. Allen, Seattle, WA (US); Brian J. Boshes, Seattle, WA (US); Gregory P. Niejadlik, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 190 days.

(21) Appl. No.: 12/956,669

(22) Filed: Nov. 30, 2010

(51) Int. Cl.
*G06Q 30/00* (2012.01)
(52) U.S. Cl.
USPC ............................. 705/26.35; 705/26.1
(58) Field of Classification Search
USPC ............................. 705/26.1, 26.35
See application file for complete search history.

(56) References Cited

U.S. PATENT DOCUMENTS

| | | | |
|---|---|---|---|
| 5,845,265 A * | 12/1998 | Woolston | 705/37 |
| 2002/0007344 A1 * | 1/2002 | Kikuchi | 705/39 |
| 2003/0174823 A1 * | 9/2003 | Justice et al. | 379/145 |
| 2007/0192126 A1 * | 8/2007 | Ganesh | 705/1 |
| 2007/0250403 A1 * | 10/2007 | Altschuler | 705/26 |
| 2008/0147511 A1 * | 6/2008 | Edwards | 705/18 |
| 2008/0275760 A1 * | 11/2008 | Easterly et al. | 705/10 |
| 2009/0064311 A1 * | 3/2009 | Clark et al. | 726/14 |
| 2012/0054109 A1 * | 3/2012 | Selsby | 705/80 |
| 2013/0073408 A1 * | 3/2013 | Hammond et al. | 705/26.1 |

* cited by examiner

*Primary Examiner* — Yogesh C Garg

(74) *Attorney, Agent, or Firm* — Thomas | Horstemeyer, LLP

(57) ABSTRACT

Disclosed are various embodiments for facilitating expedited registration of sellers in an electronic marketplace. It is determined in one or more computing devices whether a buyer in an electronic marketplace is preapproved for registration as a seller in the electronic marketplace based at least in part on one or more factors related to a history of the buyer in the electronic marketplace. The buyer is invited to register as a seller in the electronic marketplace using an expedited registration process when the buyer is preapproved. The expedited registration procedure leverages previously collected data that is associated with the buyer to omit one or more data collection tasks.

22 Claims, 7 Drawing Sheets

EXPEDITED SELLER REGISTRATION

BACKGROUND

An electronic marketplace may allow a multitude of merchants to sell items through a common network site. Integrated search tools of the electronic marketplace may permit customers to search and browse inventory of all of the merchants at the same time. The electronic marketplace may be dynamic, such that new merchants may join and contribute and/or update their inventory at any time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating an expedited registration procedure for sellers in an electronic marketplace. As part of registering as a seller in an electronic marketplace, a user may have to supply a variety of information, such as, for example, contact information, a billing address, a payment instrument, and other information. In order to reduce fraud, a seller registration process may include one or more verification tasks to verify the identity of the potential seller. Such verification tasks may be time consuming and cumbersome. Various embodiments of the present disclosure seek to simplify the registration process for credible buyers in the electronic marketplace. Information previously collected regarding the credible buyers may be leveraged in expediting the seller registration procedure. By simplifying the registration process, more sellers may choose to participate in the electronic marketplace, which may lead to more competitive pricing that will attract more buyers. In the following discussion, a general description of the system and its components is provided, followed by a discussion of the operation of the same.

Figure 1:
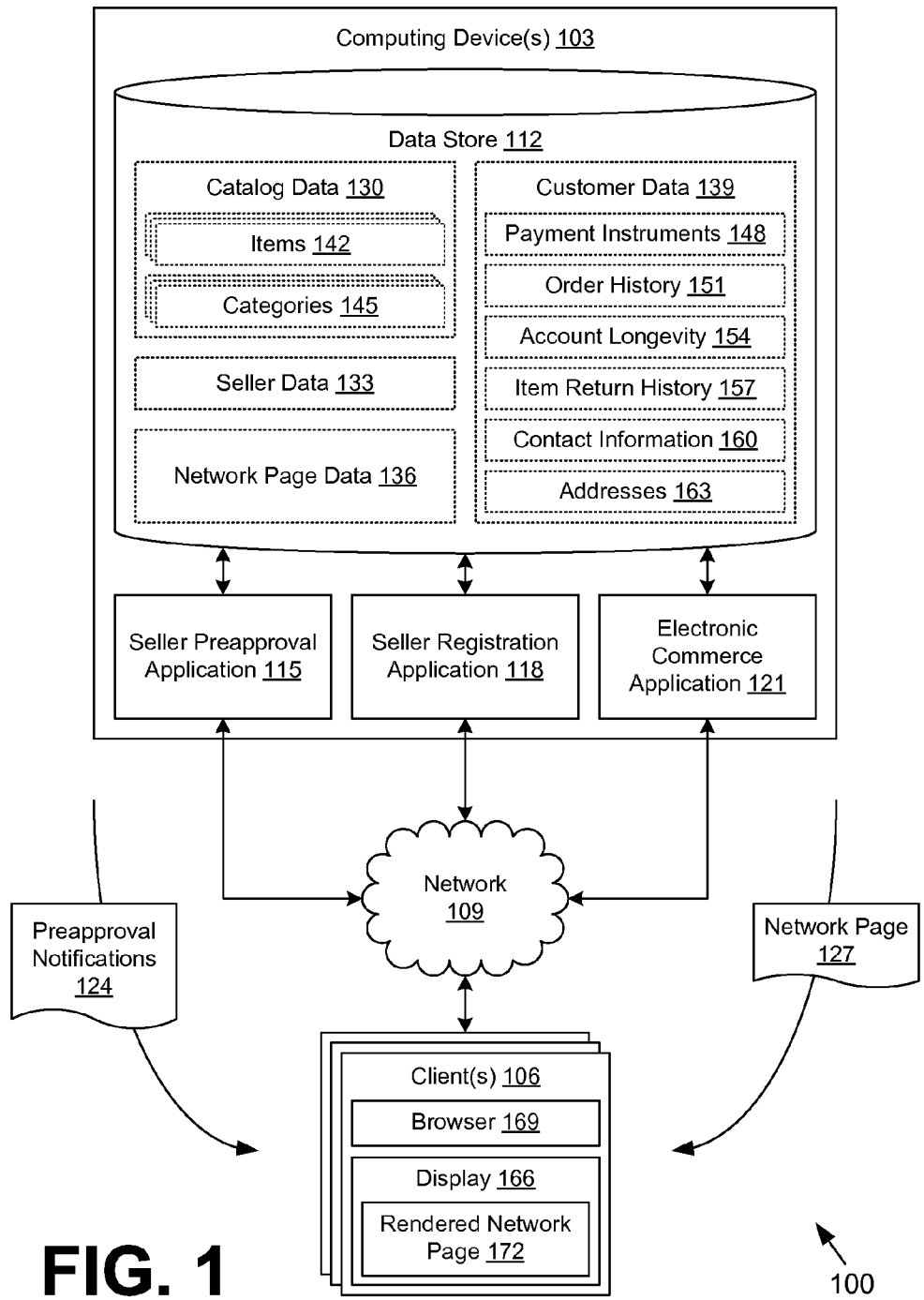
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a seller preapproval application 115, a seller registration application 118, an electronic commerce application 121, and other applications, services, processes, systems, engines, or functionality not discussed in detail herein. Although the seller preapproval application 115, the seller registration application 118, and the electronic commerce application 121 are described as discrete programs, it is understood that the functionality involved may be structured in a variety of ways involving any number of programs or applications.

The seller preapproval application 115 is executed to examine data regarding customers of the electronic marketplace and to preapprove certain trusted customers to become sellers by way of an expedited registration procedure. The seller preapproval application 115 may also be executed to generate preapproval notifications 124 to inform the preapproved customers of their preapproved status and to invite them to sell items previously purchased through the electronic marketplace.

The seller registration application 118 is executed to facilitate the registration of sellers in the electronic marketplace. To this end, the seller registration application 118 may employ different procedures for registering, for example, customers who are preapproved, customers who are not preapproved, and/or non-customers. In one embodiment, the seller registration application 118 may generate one or more network pages 127, such as web pages, with forms that facilitate data collection.

The electronic commerce application 121 is executed in order to facilitate the online purchase of items from the electronic marketplace over the network 109. The electronic commerce application 121 also performs various backend functions associated with the online presence of an electronic marketplace in order to facilitate the online purchase of items as will be described. For example, the electronic commerce application 121 generates network pages 127 such as, for example, web pages and/or other types of network content that are provided to clients 106 for the purposes of promoting and selecting items for purchase, rental, download, lease, or any other forms of consumption.

The data stored in the data store 112 includes, for example, catalog data 130, seller data 133, network page data 136, customer data 139, and potentially other data. The catalog data 130 includes a plurality of items 142 offered by a multitude of sellers through an electronic marketplace. An item 142 may refer to a product, good, service, software download, multimedia download, social networking profile, or any combination, bundle, or package thereof, that may be offered for sale, purchase, rental, lease, download, and/or any other form of consumption as may be appreciated. The various data stored in catalog data 130 may include, for example, titles, descriptions, quantities, conditions, images, options, weights, customer reviews, customer ratings, keywords, shipping restrictions, prices, tax classifications, unique identifiers, and any other data related to items 142. Each of the items 142 may be organized into one or more categories 145 as desired.

The seller data 133 includes various data associated with sellers in the electronic marketplace. Such data may include, but is not limited to, business name, tax identification, place of establishment, billing addresses, payment instruments, telephone numbers, and other data. The network page data 136 includes various data related to the generation of network pages 127. The network page data 136 may include, for example, text, templates, code, graphics, images, audio, animations, multimedia, and/or other data used in generating network pages 127.

The customer data 139 includes various data associated with customers or buyers in the electronic marketplace. To this end, the customer data 139 may include, for example, payment instruments 148, order history 151, account longevity 154, item return history 157, contact information 160, addresses 163, and/or other data. The payment instruments 148 may correspond to credit cards, debit cards, checking accounts, savings accounts, gift cards, and/or other funding sources previously presented and verified in the electronic marketplace. The order history 151 may include data relating to previous orders placed by the customer, dates on which the orders were placed, items 142 purchased, prices paid, shipping methods, shipping addresses, and so on. The account longevity 154 provides a length of time that the customer has been registered in the electronic marketplace. In embodiments where customer registration is not mandatory, the account longevity 154 provides a length of time since the customer placed a first order, the customer began visiting the electronic marketplace, and/or some other event.

The item return history 157 describes a frequency of returned items 142 associated with the customer. Other negative outcomes may be tracked in the customer data 139 such as, for example, items 142 reported by customers to be lost or stolen, customer interactions with support, negative reviews of sellers, and so on. The contact information 160 may include a variety of information regarding the customer including, for example, name, telephone number, fax number, email address, and so on. The addresses 163 may include addresses that are provided as shipping addresses, billing addresses, and/or other addresses that may be associated with customers.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smart phones, set-top boxes, music players, web pads, tablet computer systems, game consoles, electronic book readers, or other devices with like capability. The client 106 may include a display 166. The display 166 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 169 and/or other applications. The browser 169 may be executed in a client 106, for example, to access and render network pages, such as web pages, or other network content served up by the computing device 103 and/or other servers, thereby generating a rendered network page 172 on the display 166. The client 106 may be configured to execute applications beyond the browser 169 such as, for example, email applications, instant message applications, and/or other applications.

Next, a general description of the operation of the various components of the networked environment 100 is provided. To begin, the seller preapproval application 115 may execute to determine which of the customers of the electronic marketplace are preapproved for registration as sellers in the electronic marketplace by way of an expedited registration procedure. In various embodiments, the seller preapproval application 115 may be executed periodically or in response to an event. One such event may be a customer browsing the electronic marketplace. In such a case, the seller preapproval application 115 may determine whether one customer is preapproved. In other embodiments, the seller preapproval application 115 may examine all buyers who are not yet sellers for possible preapproval.

Customers are preapproved to become sellers based on a measure of trust or credibility obtained by analysis of the customer data 139 that provides a history for the customer in the electronic marketplace. Various factors relating to the history of the customer in the electronic marketplace may be used in determining whether a customer is preapproved. For example, a customer who has a relatively high account longevity 154 may be more likely to be preapproved than a customer who first registered with the electronic marketplace during the same day. Similarly, a customer who has configured a valid payment instrument 148 may be more likely to be preapproved. Factors such as, for example, a high item return history 157, frequent customer service complaints, chargebacks, bounced checks, and so on may negatively affect whether a customer is preapproved.

A customer who has purchased relatively few items 142 may be less likely to be preapproved than a customer with a lengthy order history 151. Customers who have frequently changed addresses 163 may be less likely to be preapproved than customers who seldom change addresses 163. Customers who purchase high value items may be more likely to be preapproved than customers who purchase low value items exclusively. As can be seen from the non-limiting examples provided above, there are many factors that may be used in determining whether a customer is preapproved as a seller.

The seller preapproval application 115 may be configured to generate preapproval notifications 124 to encourage customers to become sellers in the electronic marketplace. In some cases, the preapproval notification 124 will merely comprise an invitation to the customer to sell one or more items 142 in the electronic marketplace. In other cases, the preapproval notification 124 may inform the customer of the preapproval status and the availability of an expedited seller registration option. The preapproval notification 124 may be transmitted to the customer at a client 106 by way of an electronic message, such as, for example, an email message, an instant message, a text message, a message embedded within a network page 127, etc. In other embodiments, the preapproval notification 124 may be included within a telephone call, printed material, and/or other forms of communication.

In various embodiments, the seller preapproval application 115 may send preapproval notifications 124 to customers who are preapproved and have purchased selected items 142. The preapproval notifications 124 may exhort the customers to sell the items 142 in the electronic marketplace. The items 142 may be selected, for example, based on a relatively high sales price, a relatively high turnover, a relatively low inventory, or other factors computed relative to other items 142 that indicate a demand for the selected items 142 in the electronic marketplace. The items 142 may also be selected based on categories 145.

When customers are browsing various network pages 127 of the electronic marketplace that are served up by the electronic commerce application 121, the network pages 127 may include invitations to become a seller in the electronic marketplace. The invitations may be generalized or associated with specific items 142. The invitations may be included for items 142 associated with any of categories 145 or only specific ones of the categories 145. The invitations may be presented differently based on the item 142. As a non-limiting example, the invitation may be emphasized on a detail network page 127 regarding an item 142 that has been identified as previously purchased by the customer based on the order history 151. As another non-limiting example, the invitation may be emphasized on a detail network page 127 regarding an item 142 that is in high demand in the electronic marketplace. The invitations may also appear differently in the network pages 127 based, for example, on whether the customer is preapproved, not preapproved but registered as a customer, or not preapproved and not registered as a customer.

The seller registration application 118 is configured to generate one or more network pages 127 or components of network pages 127 to facilitate seller registration. Various form elements and/or other elements may be used. When a customer is preapproved to register as a seller, an expedited registration procedure may be employed. The expedited registration procedure may omit one or more data collection tasks by leveraging previously collected data that is associated with a customer. As a non-limiting example, if the contact information 160 associated with the customer includes the name and email address of the customer, form fields for name and email address may be prepopulated with the stored name and email address of the customer from the contact information 160. Alternatively, form fields for name and email address may be omitted from the network page 127 when the data is available from the contact information 160. In some embodiments, however, it may be preferable to present the form fields as prepopulated in order to allow the customer to make changes if needed.

In some embodiments, the expedited registration procedure may omit one or more data collection tasks that relate to seller verification tasks. As a non-limiting example, a non-expedited registration procedure for customers who are not preapproved may include a telephone number verification procedure. In such a procedure, a customer is requested to provide a telephone number through a form on a network page 127. The seller registration application 118 will initiate a call to the provided telephone number. During the call, the customer provides a verification credential such as, for example, an identification number that was included in the network page 127. Through this procedure, the seller registration application 118 is able to confirm that the telephone number is valid and that the same customer who is performing the registration can be reached by way of the telephone number.

A variation on the telephone number verification procedure may have the seller registration application 118 provide a verification credential to the customer over a call to the provided telephone number. Thereafter, the customer may enter the verification credential into a form on a network page 127 to confirm receipt of the verification credential by way of the telephone call. Although a telephone number may be chosen for verification as a seller verification task, it is understood that other seller verification tasks may be performed in other embodiments. For example, addresses, email addresses, bank accounts, credit cards, and/or other data may be validated through various seller verification tasks. It is noted that when a seller is preapproved, such seller verification tasks may be skipped to expedite the seller registration procedure.

In one embodiment, the expedited registration procedure may employ a single selection of one user interface component in a network page 127 to facilitate ease of registration. For example, a detail network page 127 regarding an item 142 may include a form to register as a seller and to sell the item 142. The form may elicit, for example, condition of the item 142, comments regarding the condition, quantity of the item 142, price of the item 142, and/or other data regarding the item(s) 142 to be sold. In one embodiment, all fields of the form may be prepopulated with default values. A button or other user interface component may be provided to register the seller with the default parameters in the seller data 133 and to list the item(s) 142. The button may be displayed in conjunction with an agreement to accept terms and conditions associated with being a seller in the electronic marketplace. Accordingly, selection of the button may indicate an acceptance of the terms and conditions.

Figure 2:
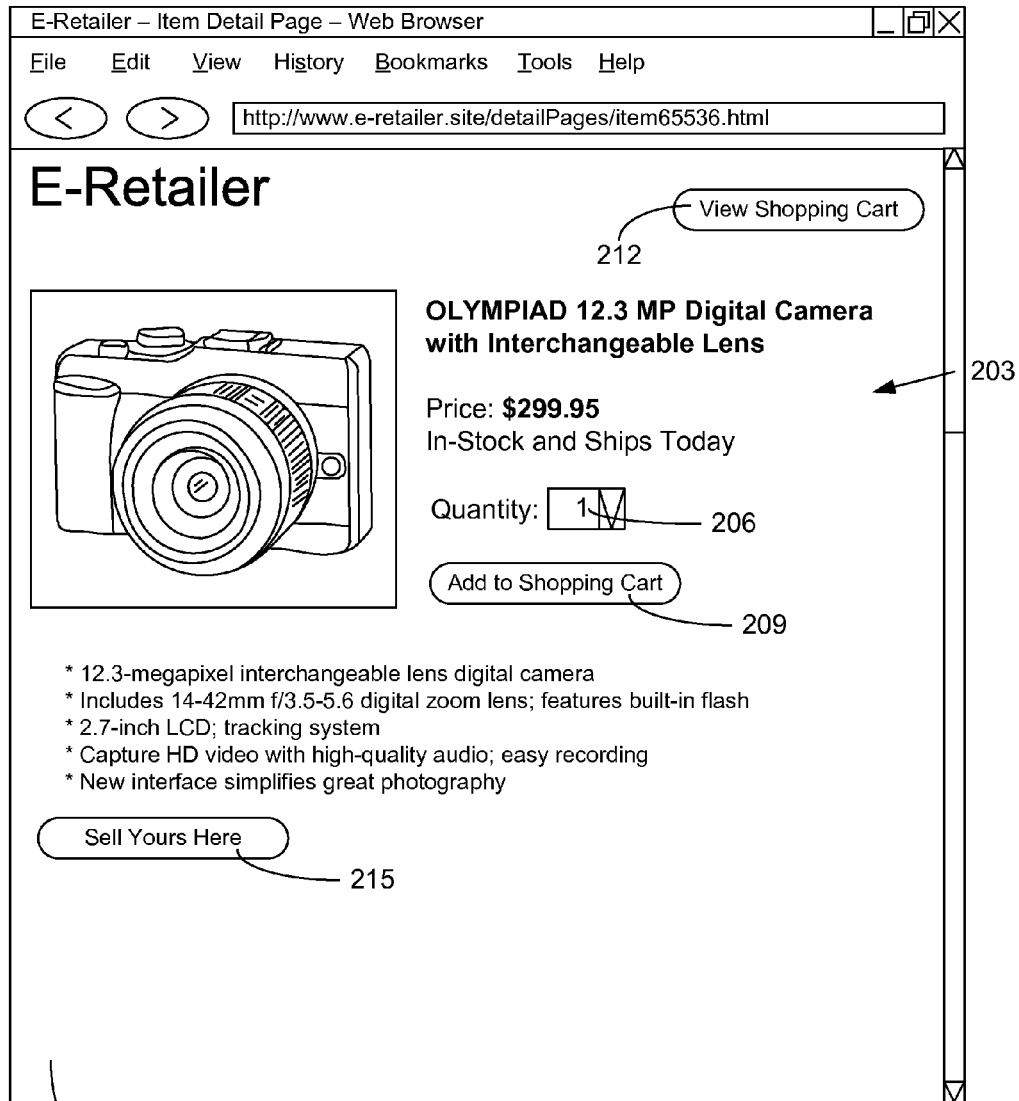
FIGS. 2-4 are drawings of examples of user interfaces depicting network pages rendered in a browser executed in a client in the networked environment of FIG. 1 according to various embodiments of the present disclosure.

Referring next to FIG. 2, shown is a user interface 200 depicting a rendered network page 172a rendered in a browser 169 (FIG. 1) executed in a client 106 (FIG. 1) in the networked environment 100 (FIG. 1). In particular, the rendered network page 172a corresponds to a detail network page regarding an item 142 (FIG. 1). The rendered network page 172a includes an item summary 203, a quantity selection tool 206, a list addition tool 209, a list viewing tool 212, a seller registration tool 215, and/or other user interface components.

The item summary 203 includes various information about the item 142, including, for example, title, image, price, inventory status, shipping estimate, feature lists, and/or other information. The quantity selection tool 206 facilitates selection of a quantity of the item 142 for addition to a list of items 142. To this end, the quantity selection tool 206 may correspond to a drop-down box, slider, text input field, radio buttons, and/or any other user interface component capable of indicating a quantity of the item 142.

Though the list addition tool 209, the list viewing tool 212, and the seller registration tool 215 are depicted as buttons, it is understood that they may comprise links and/or other user interface components in other embodiments. The list addition tool 209 facilitates the addition of the item 142 in the selected quantity to a shopping cart, wish list, or other list of items 142. The list viewing tool 212 launches a network page 127 (FIG.

1) or region within the rendered network page 172a that shows a listing of the items 142 in a shopping cart, wish list, or other list of items 142.

The seller registration tool 215 is used initiate registration of the customer as a seller in the electronic marketplace. The customer may be a previous buyer of items 142 from the electronic marketplace and/or may be registered as a buyer as an electronic marketplace. The identity of the customer may be ascertained in those cases by way of cookies, session identifiers, and/or other mechanisms of login tracking. It is understood that the appearance of the seller registration tool 215 may vary based upon the customer. In one embodiment, when the customer is preapproved, the seller registration tool 215 may comprise a single button. In another embodiment, when the customer is not preapproved, the seller registration tool 215 may comprise a lengthy form that may span multiple network pages 127. In some embodiments, the seller registration tool 215 may comprise various form elements to gather information about the item 142 to be sold in conjunction with the seller registration.

Figure 3:
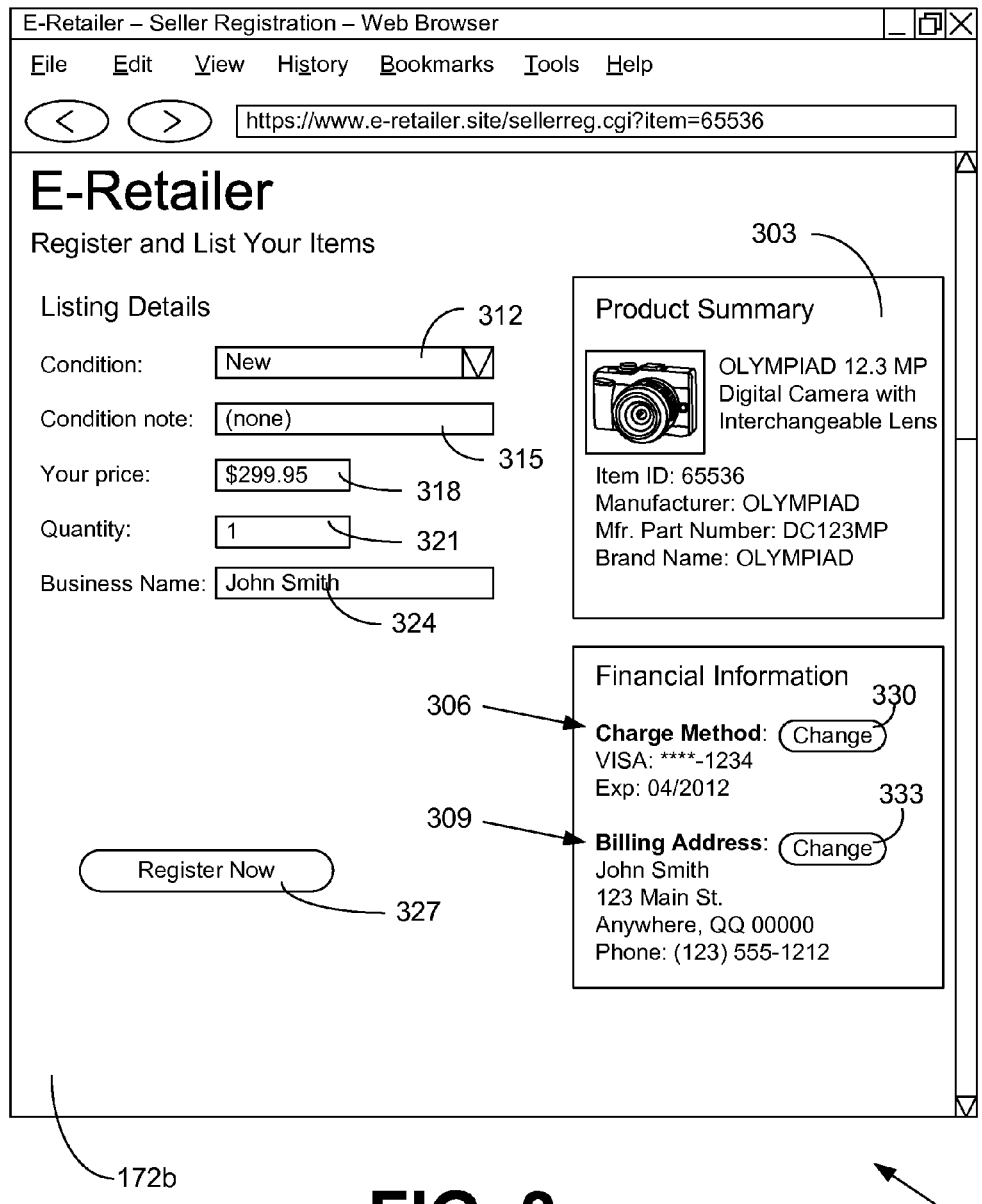

Turning now to FIG. 3, shown is a user interface 300 depicting a rendered network page 172b rendered in a browser 169 (FIG. 1) executed in a client 106 (FIG. 1) in the networked environment 100 (FIG. 1). In particular, the rendered network page 172b depicts one non-limiting example of a seller registration form implementing an expedited registration procedure for preapproved customers. The rendered network page 172b may include, for example, an item summary 303, a payment instrument description 306, an address description 309, an item condition selection tool 312, a condition description specification tool 315, a price specification tool 318, a quantity specification tool 321, a business name specification tool 324, a registration submission tool 327, and/or other components.

The item summary 303 includes various information related to the item 142 that is to be offered by the prospective seller in the electronic marketplace. Such information may include title, image, unique identifier, manufacturer name, manufacturer part number, categories, brand names, etc. The item summary 303 provides reassurance to the customer regarding which specific item 142 is to be offered. In embodiments where a seller registration may be performed without adding an item 142, the item summary 303 may be absent. The information contained in the item summary 303 may vary in other embodiments.

The payment instrument description 306 describes a payment instrument 148 (FIG. 1) that has been previously configured for the customer. The information displayed may vary based, for example, on the type of payment instrument 148. A payment instrument change tool 330 may be provided to edit or change the payment instrument 148. The address description 309 describes an address 163 (FIG. 1) configured for the customer, such as, for example, a billing address 163, a business address 163, etc. An address change tool 333 may be provided to edit or change the selected address 163.

The item condition selection tool 312 may be used to assign a condition to the item 142 to be added. Non-limiting examples of conditions may include "new," "used—like new," "used—good," "used—acceptable," "collectible," and so on. The item condition selection tool 312 may comprise a drop-down box, radio buttons, and/or other user interface elements. The item condition selection tool 312 may be prepopulated with a condition, e.g., "new" as shown in FIG. 3 or some other condition. The condition description specification tool 315 may allow the seller to further describe the condition of the item 142. For example, for an item 142 that is a book, a seller may enter "dust cover missing," "some scratches on the front," and or other condition descriptions. The condition description specification tool 315 may be prepopulated with a value, e.g., "(none)" as shown in FIG. 3 or some other description.

The price specification tool 318 allows the seller to enter a specified price for the item 142. As shown in FIG. 3, the price specification tool 318 may be prepopulated with a price. The default price, if provided, may correspond to a price recommendation for the particular item 142. Such a price recommendation may be determined based, for example, on a sales history of the item 142, competing prices for the item 142, and/or other factors. In FIG. 3, the default price of $299.95 corresponds to the price shown for the item 142 in FIG. 2. The quantity specification tool 321 allows the seller to enter a specified quantity of the item 142 that is available for ordering. In one embodiment, the quantity specification tool 321 may be prepopulated with a default value, e.g., one or some other value.

The business name specification tool 324 may permit the customer to enter a different name to be used as a business name for identification of the customer as a seller in the electronic marketplace. In one embodiment, the business name specification tool 324 may be prepopulated with a personal name of the customer, e.g., "John Smith." In various embodiments, the customer may be able to specify other business-related information, such as place of establishment, tax number, etc. The registration submission tool 327 is used to submit the registration form and complete the registration process for the customer as a seller in the electronic marketplace. Further information about terms and conditions agreed to when registering as a seller may be displayed adjacent to the registration submission tool 327 in some embodiments. In addition, a checkbox and/or other user interface components may be provided for the customer to indicate an agreement with the terms and conditions.

Figure 4:
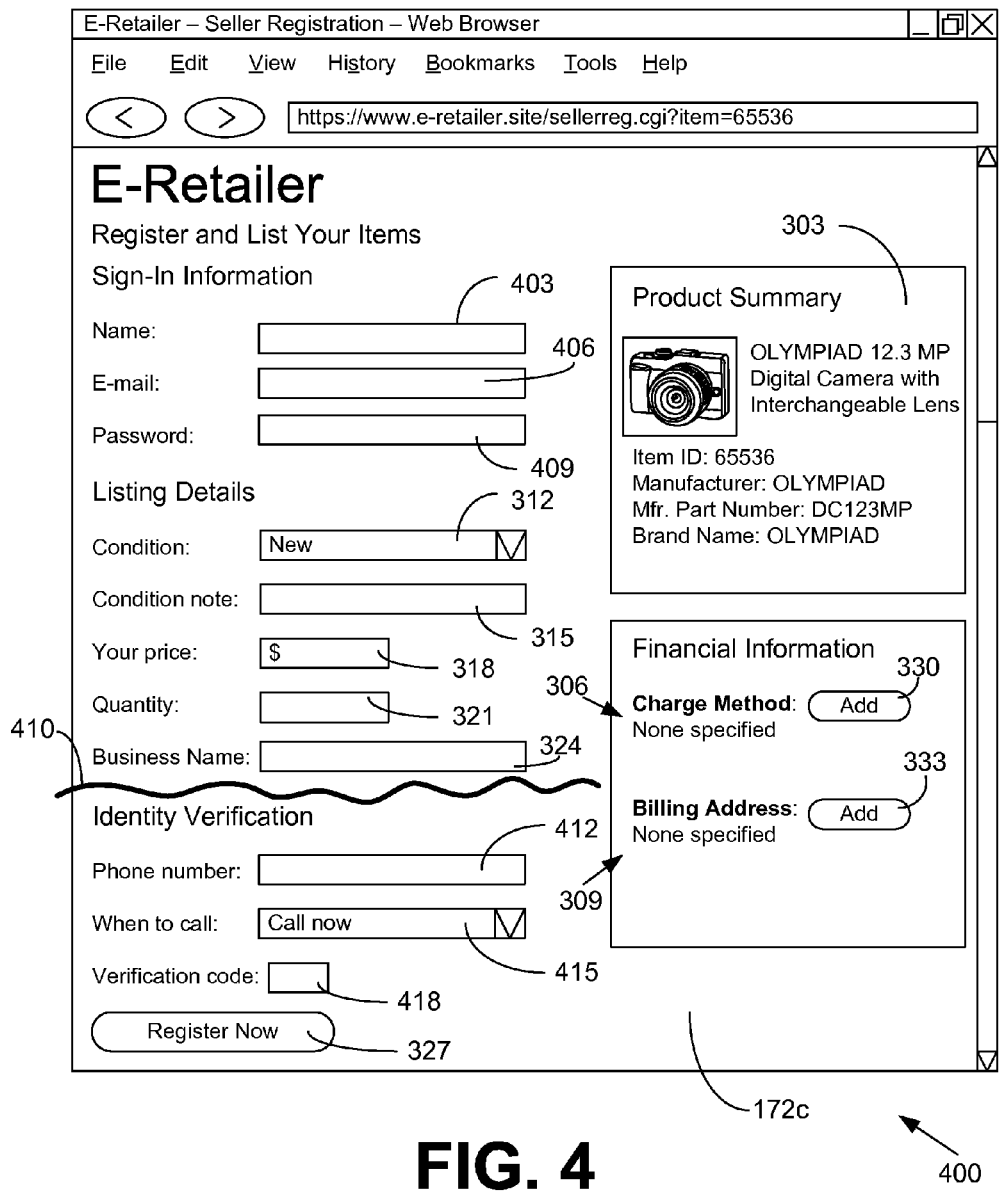

Moving on to FIG. 4, shown is a user interface 400 depicting a rendered network page 172c rendered in a browser 169 (FIG. 1) executed in a client 106 (FIG. 1) in the networked environment 100 (FIG. 1). In particular, the rendered network page 172c depicts one non-limiting example of a seller registration form implementing a non-expedited registration procedure for non-preapproved customers. Like the rendered network page 172b, the rendered network page 172c may include, for example, an item summary 303, a payment instrument description 306, an address description 309, an item condition selection tool 312, a condition description specification tool 315, a price specification tool 318, a quantity specification tool 321, a business name specification tool 324, and a registration submission tool 327.

Unlike the rendered network page 172b, the payment instrument description 306, the address description 309, and the other various tools are not prepopulated based on customer data 139 (FIG. 1) such as addresses 163 (FIG. 1) or payment instruments 148 (FIG. 1). Furthermore, additional data entry fields are provided to obtain information that may already have been associated with a customer in the example of FIG. 3. To this end, a name specification tool 403, an email address specification tool 406, a password specification tool 409, and/or other data collection components may be provided.

A line 410 is shown in FIG. 4 to indicate that further data collection components may be included as part of the non-expedited registration process but are omitted merely to simplify the illustration of FIG. 4. Such data collection components may also collect addresses, cities, states, zip codes, fax numbers, and other information. Such data collection components may be provided within one rendered network page 172c or may span multiple rendered network pages 172c.

In addition, several components are provided to implement a seller verification task of verifying a telephone number. A telephone number specification tool 412 is provided for the customer to enter a telephone number. A call time selection tool 415 may be provided to allow the customer to select a time at which the telephone number will be called. The call time selection tool 415 may comprise a drop-down box, radio buttons, and/or other user interface components. A verification credential component 418 may be provided for the customer to enter a verification credential provided during the telephone call, for showing a verification credential to the customer for the customer to provide during the call, and/or to facilitate other forms of usage of a verification credential.

Figure 5:
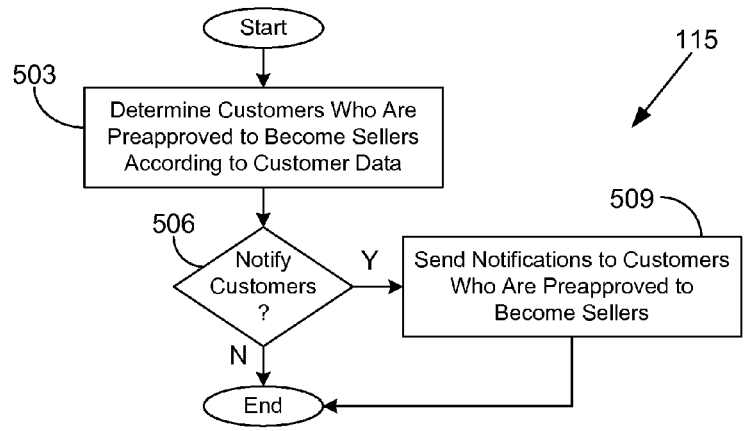
FIG. 5 is a flowchart illustrating one example of functionality implemented as portions of a seller preapproval application executed in a computing device in the networked environment of FIG. 1 according to various embodiments of the present disclosure.

Referring next to FIG. 5, shown is a flowchart that provides one example of the operation of a portion of the seller preapproval application 115 according to various embodiments. It is understood that the flowchart of FIG. 5 provides merely an example of the many different types of functional arrangements that may be employed to implement the operation of the portion of the seller preapproval application 115 as described herein. As an alternative, the flowchart of FIG. 5 may be viewed as depicting an example method implemented in the computing device 103 (FIG. 1) according to one or more embodiments.

Beginning with box 503, the seller preapproval application 115 determines customers of the electronic marketplace who are preapproved to become sellers according to customer data 139 (FIG. 1) indicating a customer history. As non-limiting examples, the seller preapproval application 115 may consider whether a customer has a valid payment instrument 148 (FIG. 1) configured, the number of orders placed by the customer in the order history 151 (FIG. 1), the account longevity 154 (FIG. 1), the item return history 157 (FIG. 1), the variability of shipping addresses 163 (FIG. 1), the value of items 142 (FIG. 1) ordered, and other factors. In one embodiment, whether the customer is preapproved may depend on a category 145 (FIG. 1) of an item 142 to be added, as the proprietor of the electronic marketplace may wish to restrict entry of sellers to certain categories 145. In box 506, the seller preapproval application 115 determines whether preapproved customers are to be notified. If the seller preapproval application 115 determines that preapproved customers are not to be notified, the seller preapproval application 115 ends.

Otherwise, if the seller preapproval application 115 determines that the preapproved customers are to be notified, the seller preapproval application 115 proceeds to box 509. In box 509, the seller preapproval application 115 sends notifications to customers who are preapproved to become sellers. The notifications may take the form of an email, an announcement within a network page 127 (FIG. 1), a telephone call, a text message, a direct mailing of printed matter, and/or other forms of communication. Thereafter, the portion of the seller preapproval application 115 ends.

Figure 6:
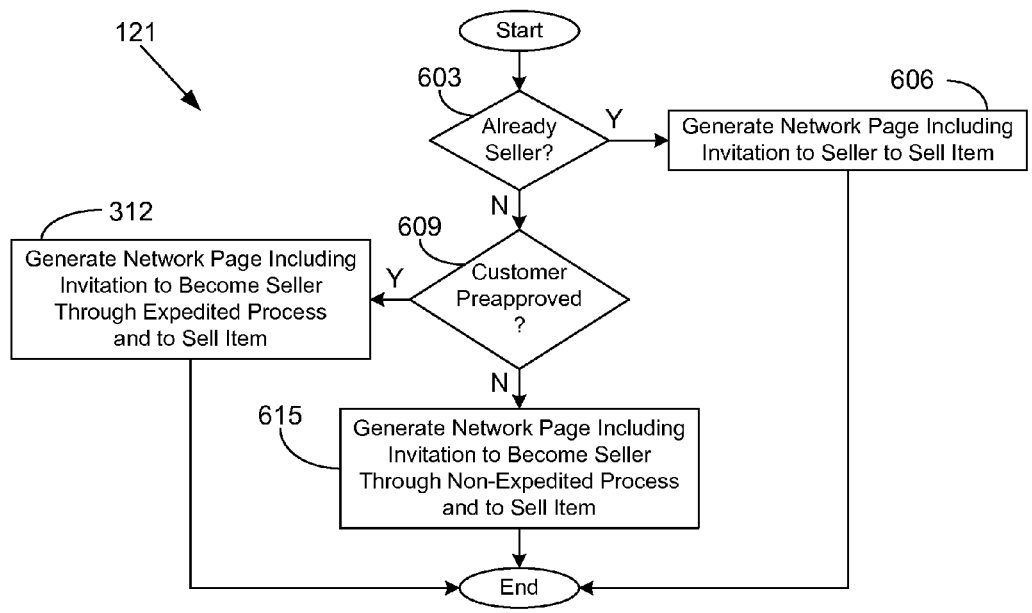
FIG. 6 is a flowchart illustrating one example of functionality implemented as portions of an electronic commerce application executed in a computing device in the networked environment of FIG. 1 according to various embodiments of the present disclosure.

Moving on to FIG. 6, shown is a flowchart that provides one example of the operation of a portion of the electronic commerce application 121 according to various embodiments. It is understood that the flowchart of FIG. 6 provides merely an example of the many different types of functional arrangements that may be employed to implement the operation of the portion of the electronic commerce application 121 as described herein. As an alternative, the flowchart of FIG. 6 may be viewed as depicting an example method implemented in the computing device 103 (FIG. 1) according to one or more embodiments.

Beginning with box 603, the electronic commerce application 121 determines whether the customer is already a seller in the electronic marketplace. If the customer is already a seller, the electronic commerce application 121 moves to box 606 and generates a network page 127 (FIG. 1) that includes an invitation for the seller to sell an item 142 (FIG. 1). Thereafter, the portion of the electronic commerce application 121 ends.

If the customer is not already a seller, the electronic commerce application 121 instead moves to box 609 and determines whether the customer is preapproved to register as a seller. If the customer is preapproved to register as a seller, the electronic commerce application 121 proceeds to box 612 and generates a network page 127 including an invitation for the customer to become a seller through an expedited process and to sell an item 142. Thereafter, the portion of the electronic commerce application 121 ends.

If the customer is not preapproved, the electronic commerce application 121 moves to box 615 and generates a network page 127 including an invitation for the customer to become a seller through a non-expedited process and to the sell an item 142. Thereafter, the portion of the electronic commerce application 121 ends.

Figure 7:
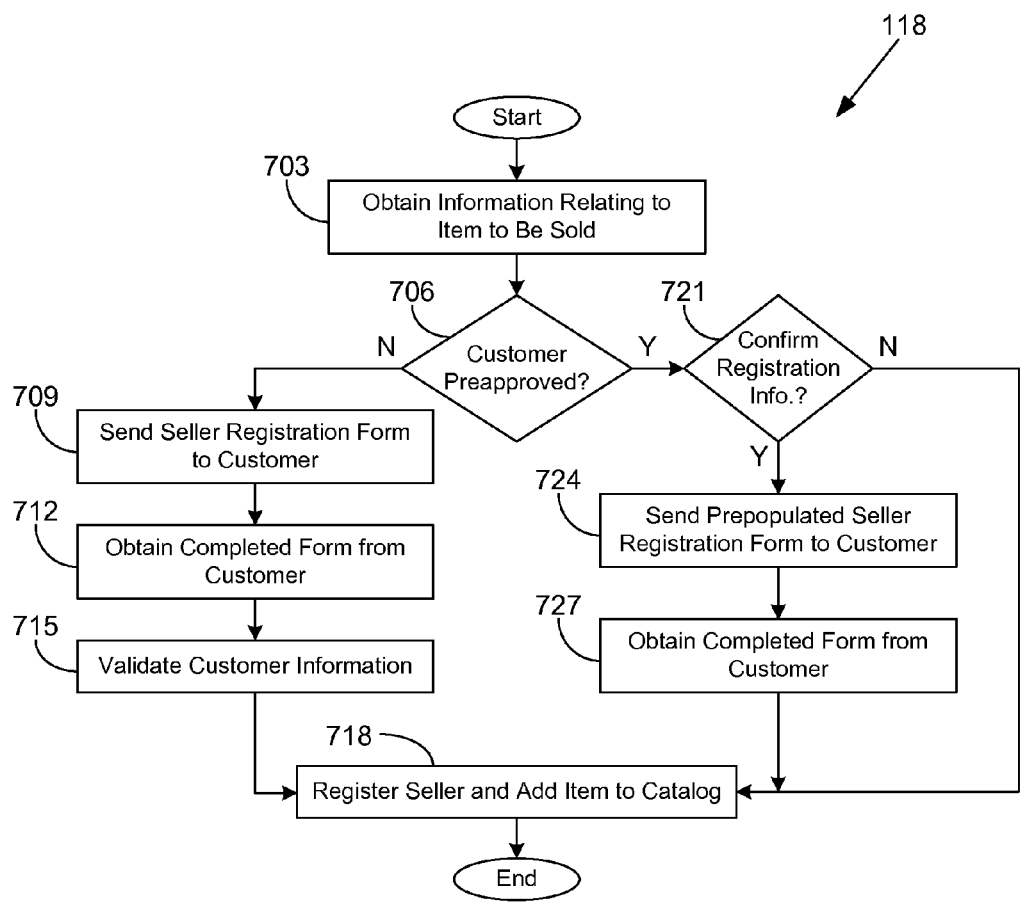
FIG. 7 is a flowchart illustrating one example of functionality implemented as portions of a seller registration application executed in a computing device in the networked environment of FIG. 1 according to various embodiments of the present disclosure.

Turning now to FIG. 7, shown is a flowchart that provides one example of the operation of a portion of the seller registration application 118 according to various embodiments. It is understood that the flowchart of FIG. 7 provides merely an example of the many different types of functional arrangements that may be employed to implement the operation of the portion of the seller registration application 118 as described herein. As an alternative, the flowchart of FIG. 7 may be viewed as depicting an example method implemented in the computing device 103 (FIG. 1) according to one or more embodiments.

Beginning with box 703, the seller registration application 118 obtains information relating to an item 142 (FIG. 1) to be sold in an electronic marketplace. Such information may relate to the condition, description, price, quantity, and other data associated with an item 142 offered in the electronic marketplace. In box 706, the seller registration application 118 determines whether the customer is preapproved to register as a seller. The seller registration application 118 may, for example, employ the seller preapproval application 115 (FIG. 1) to make this determination.

If the customer is not preapproved to register as a seller, the seller registration application 118 begins a non-expedited seller registration process and transitions to box 709. In box 709, the seller registration application 118 sends a seller registration form to the customer. FIG. 4 illustrates one example of such a form. Next, in box 712, the seller registration application 118 obtains the completed form from the customer. In box 715, the seller registration application 118 validates customer information. The validation may include verifying a telephone number, email address, bank account, credit card, etc. In box 718, the seller registration application 118 registers the seller and adds the item 142 to the catalog of the electronic marketplace. Thereafter, the portion of the seller registration application 118 ends.

If the seller registration application 118 instead determines in box 706 that the customer is preapproved to register as a seller, the seller registration application 118 moves to box 721 and begins an expedited registration procedure. Such a procedure may employ a single selection of one user interface component such as, for example, the seller registration tool 215 in FIG. 2, or may involve a more complex form such as, for example, that depicted in FIG. 3. In box 721, the seller registration application 118 determines whether the registration information is to be confirmed by the customer. If the registration information is not to be confirmed by the customer, the seller registration application 118 moves to box 718 and registers the customer as a seller using stored customer data 139 (FIG. 1) and adds the item 142 to the catalog of the electronic marketplace. Thereafter, the portion of the seller registration application 118 ends.

If the seller registration application 118 instead determines in box 721 that the registration information is to be confirmed by the customer, the seller registration application 118 transitions to box 724 and sends a seller registration form to the customer that has been prepopulated with data from the customer data 139. The customer may make changes to the prepopulated data or simply accept it as is. In box 727, the seller registration application 118 obtains a completed form from the customer. Next, in box 718, the seller registration application 118 registers the customer as a seller using the data from the seller registration form and adds the item 142 to the catalog of the electronic marketplace. Thereafter, the portion of the seller registration application 118 ends.

Figure 8:
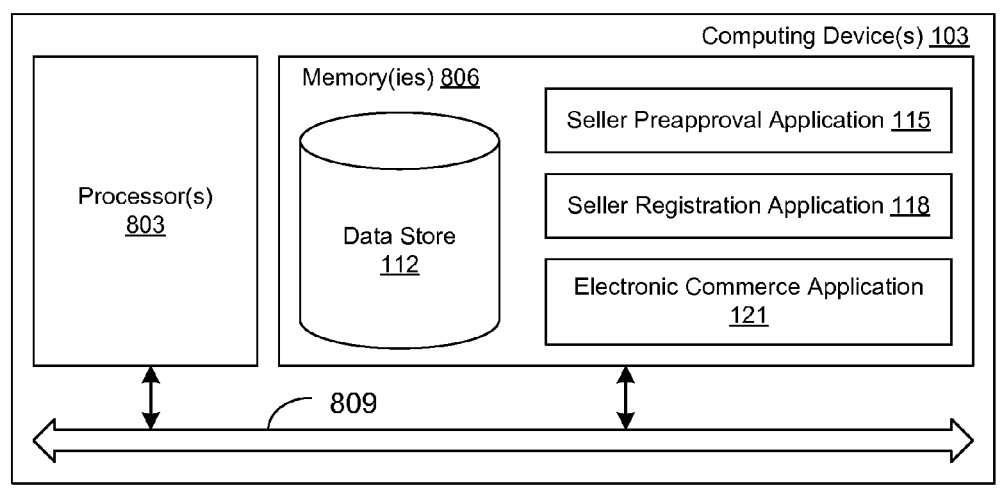
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the seller preapproval application 115, the seller registration application 118, the electronic commerce application 121, and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the seller preapproval application 115, the seller registration application 118, the electronic commerce application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 show the functionality and operation of an implementation of portions of the seller preapproval application 115, the seller registration application 118, and the electronic commerce application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the seller preapproval application 115, the seller registration application 118, and the electronic commerce application 121, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable by a computing device, wherein, when executed, the program causes the computing device to at least:
determine a measure of buyer credibility for a buyer in an electronic marketplace by analyzing a plurality of buyer credibility factors relating to a history of the buyer in the electronic marketplace;
determine whether the buyer is preapproved to register as a seller in the electronic marketplace, wherein the preapproval of the buyer is based at least in part on the measure of buyer credibility;
generate a detail network page regarding a product offered for purchase in the electronic marketplace, the detail network page including an invitation to the buyer to sell the product in the electronic marketplace;
implement an expedited seller registration procedure that omits at least one seller verification task and is initiated and completed through a single selection of one user interface component in the detail network page; and
implement a non-expedited seller registration procedure that includes at least one seller verification task;
wherein the invitation is configured to initiate the expedited seller registration procedure when the buyer is determined to be preapproved, and the invitation is configured to initiate the non-expedited seller registration procedure when the buyer is determined not to be preapproved.

2. The non-transitory computer-readable medium of claim 1, wherein, when executed, the program further causes the computing device to perform the at least one seller verification task by:
obtaining a telephone number of the buyer through a form on a network page;
providing a verification credential to the buyer on the network page;
initiating a call to the telephone number; and
determining whether the verification credential has been provided during the call.

3. The non-transitory computer-readable medium of claim 1, wherein the expedited registration procedure and the non-expedited registration procedure include obtaining a price for the product and a condition for the product from the buyer.

4. A system comprising:
a memory configured to store computer-executable instructions; and
a processor configured to access the memory and execute the computer-executable instructions to at least:
determine a measure of buyer credibility for a buyer in an electronic marketplace by analyzing a plurality of buyer credibility factors relating to a history of the buyer in the electronic marketplace;
determine whether the buyer is preapproved for registration as a seller in the electronic marketplace based at least in part on the measure of buyer credibility;
invite the buyer to register as a seller in the electronic marketplace using an expedited registration procedure when the buyer is determined to be preapproved, the expedited registration procedure leveraging previously collected data that is associated with the buyer to omit at least one data collection task; and
when the buyer is determined not to be preapproved, refrain from inviting the buyer to register as a seller in the electronic marketplace or invite the buyer to register as a seller in the electronic marketplace using a non-expedited registration procedure that includes the at least one data collection task.

5. The non-transitory computer-readable medium of claim 1, wherein the plurality of buyer credibility factors includes at least one of: a length of time the buyer has been registered with the electronic marketplace, an item return history associated with the buyer, a purchase frequency associated with the buyer, a frequency of order shipment to a configured address of the buyer, or whether at least one valid payment instrument is associated with the buyer.

6. The system of claim 4, wherein the at least one data collection task includes verifying a telephone number of the buyer.

7. The system of claim 4, wherein the processor is further configured to at least generate at least one form to collect information about the buyer, at least one field of the at least one form being prepopulated with information obtained from the previously collected data.

8. The system of claim 4, wherein the expedited registration procedure includes a single selection of one user interface component on one network page that initiates and completes a registration of the buyer as a seller.

9. The system of claim 8, wherein the one network page includes a form to collect information about the buyer, and wherein all fields of the form are prepopulated with a respective default value.

10. The system of claim 4, wherein the plurality of buyer credibility factors includes at least one of: a length of time the buyer has been registered with the electronic marketplace, an item return history associated with the buyer, a purchase frequency associated with the buyer, a frequency of order shipment to a configured address of the buyer, or whether at least one valid payment instrument is associated with the buyer.

11. The system of claim 4, wherein the processor is further configured to at least generate a detail network page regarding an item, the detail network page including an invitation for the buyer to sell the item in the electronic marketplace.

12. The system of claim 4, wherein the processor is further configured to at least generate an electronic message to the buyer that invites the buyer to sell an item that the buyer purchased previously in the electronic marketplace.

13. The system of claim 12, wherein the electronic message is included within at least one network page of the electronic marketplace.

14. The system of claim 12, wherein the electronic message comprises an email to the buyer.

15. A computer-implemented method comprising:
    determining, by at least one computing device, a plurality of buyers in an electronic marketplace who have purchased at least one item from a catalog of items;
    determining, by the at least one computing device, individual measures of buyer credibility for the plurality of buyers by analyzing a plurality of buyer credibility factors relating to buyer history in the electronic marketplace;
    selecting, by the at least one computing device, a subset of the plurality of buyers to be preapproved to register as sellers in the electronic marketplace using an expedited registration procedure, the subset of the plurality of buyers being selected based at least in part on the individual measures of buyer credibility;
    preapproving, by the at least one computing device, the subset of the plurality of buyers to register as sellers in the electronic marketplace using the expedited registration procedure; and
    inviting, by the at least one computing device, the preapproved subset of the plurality of buyers to register as sellers in the electronic marketplace and to sell the at least one item in the electronic marketplace.

16. The computer-implemented method of claim 15, wherein the plurality of buyers are further determined based at least in part on a demand for the at least one item in the electronic marketplace.

17. The computer-implemented method of claim 16, wherein the demand for the at least one item is indicated by a turnover of an inventory of the at least one item in the electronic marketplace meeting a predefined threshold.

18. The computer-implemented method of claim 15, wherein the plurality of buyers are further determined based at least in part on a sales price of the at least one item in the electronic marketplace meeting a predefined threshold.

19. The computer-implemented method of claim 15, wherein the expedited registration procedure includes a single selection of one user interface component on one network page that initiates and completes a registration of a respective buyer as a seller, the one network page includes a form to collect information about the respective buyer, and all fields of the form are prepopulated with a respective default value.

20. The computer-implemented method of claim 15, wherein the plurality of buyer credibility factors includes at least one of: a length of time a respective buyer has been registered with the electronic marketplace, an item return history associated with the respective buyer, a purchase frequency associated with the respective buyer, a frequency of order shipment to a configured address of the respective buyer, or whether at least one valid payment instrument is associated with the respective buyer.

21. The computer-implemented method of claim 15, wherein the expedited registration procedure leverages previously collected data that is associated with each of the preapproved subset of the plurality of buyers to omit at least one data collection task.

22. The computer-implemented method of claim 15, wherein the expedited registration procedure omits a seller verification task.

* * * * *

UNITED STATES PATENT AND TRADEMARK OFFICE
CERTIFICATE OF CORRECTION

PATENT NO. : 8,768,784 B1  
APPLICATION NO. : 12/956669  
DATED : July 1, 2014  
INVENTOR(S) : Anand Varadarajan et al.

Page 1 of 1

It is certified that error appears in the above-identified patent and that said Letters Patent is hereby corrected as shown below:

In the Claims
Column 14, line 14: replace "includes at least one seller verification task" with --includes the at least one seller verification task--
Column 14, line 55: replace "a seller" with --the seller--
Column 14, line 57: replace "a seller" with --the seller--
Column 15, line 12: replace "a seller" with --the seller--
Column 16, line 5: replace "sellers" with --the sellers--
Column 16, line 10: replace "sellers" with --the sellers--

Signed and Sealed this
Twenty-fourth Day of March, 2015

Michelle K. Lee
*Director of the United States Patent and Trademark Office*